United States Defensive Publication [19] (H) [11] T966,006

Freeman et al. [43] Jan. 3, 1978

[54] AROMATIC POLYMERS

[75] Inventors: John Leslie Freeman, St. Neots; John Brewster Rose, Letchworth, both of England

[73] Assignee: Imperial Chemical Industries Limited, London, England

[21] Appl. No.: 767,332

[22] Filed: Feb. 10, 1977

[30] Foreign Application Priority Data

Feb. 10, 1975 United Kingdom ..... 5173/75

[51] Int. Cl.[2] ..... C08G 65/40

[52] U.S. Cl. ..... 260/49; 260/50

[57] ABSTRACT

Aromatic polymers having phenylene groups linked by oxygen atoms, ketone groups and sulphone groups, that is etherketone/sulphone copolymers, containing 40 to 90 and preferably 50 to 80, mole % of the repeat units

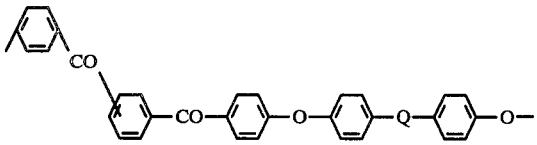

and correspondingly 10 to 60, particularly 20 to 50, mole % of repeat units

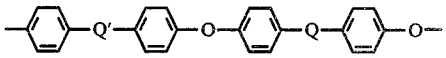

where Q and Q′ are —$SO_2$— or —CO—, the number of —$SO_2$— groups being 3 to 25% of the total number of —$SO_2$— and —CO— groups are disclosed. Such copolymers are made more cheaply than the similar copolymers of U.K. Pat. No. 1,414,422 yet exhibit improved properties of a somewhat reduced melting point, owning to the incorporation of sulphone linkages in the polymer chain, thus providing greater latitude over processing temperatures. Preferably from 10 to 20% of the total sulphone and ketone linkages in the copolymers are sulphone linkages. The disclosed copolymers are particularly suitable for wire insulation where the polymer has to retain its properties at high service temperatures.

In practice the copolymers have a reduced viscosity of at least 0.8, preferably 1.0, and a low absorbence, such as below 0.35, indicating relative freedom from structural irregularities such as chain branching, both parameters measured according to the procedures disclosed.

8 Claims, No Sheets Drawing,

26 Pages Specification

The file of this unexamined application may be inspected and copies thereof may be purchased (849 O.G. 1221, Apr. 9, 1968).